(12) United States Patent
Bonev

(10) Patent No.: US 7,707,907 B2
(45) Date of Patent: May 4, 2010

(54) PLANAR PARALLEL MECHANISM AND METHOD

(75) Inventor: Ilian Bonev, Montréal (CA)

(73) Assignee: Socovar, Société en Commandite, Montréal (CA)

( * ) Notice: Subject to any disclaimer, the term of this patent is extended or adjusted under 35 U.S.C. 154(b) by 2 days.

(21) Appl. No.: 12/093,612

(22) PCT Filed: Nov. 17, 2006

(86) PCT No.: PCT/CA2006/001885
§ 371 (c)(1),
(2), (4) Date: May 14, 2008

(87) PCT Pub. No.: WO2007/062505
PCT Pub. Date: Jun. 7, 2007

(65) Prior Publication Data
US 2008/0229860 A1    Sep. 25, 2008

Related U.S. Application Data

(60) Provisional application No. 60/738,092, filed on Nov. 17, 2005.

(51) Int. Cl.
*G05G 11/00* (2006.01)
(52) U.S. Cl. .................. 74/490.08; 901/16; 74/490.03
(58) Field of Classification Search .............. 74/490.07, 74/490.08, 490.1, 490.03; 414/749.1; 248/557, 248/560, 561; 108/20, 137, 139, 143; 269/71, 269/73; 901/16
See application file for complete search history.

(56) References Cited

U.S. PATENT DOCUMENTS 4,698,575 A    10/1987    Bouwer (Continued)

FOREIGN PATENT DOCUMENTS

CA    2259887    2/2005

OTHER PUBLICATIONS

Stéphane Ronchi et al. *PRP Planar Parallel Mechanism in Configurations Improving Displacement Resolution*, proceedings of the First International Conference on Positioning Technology, Hamamatsu, Japan, Jun. 9-11, 2004.

(Continued)

*Primary Examiner*—Richard W Ridley
*Assistant Examiner*—Phillip A Johnson
(74) *Attorney, Agent, or Firm*—Ogilvy Renault LLP

(57) ABSTRACT

A planar parallel mechanism having a platform movable in a plane along three degrees of freedom is described Existing technology fails to provide a manipulator with three degrees of freedom, wherein the mechanisms for moving the manipulator move in a decoupled fashion A manipulator and method of supporting and displacing an object which provides a solution to this problem comprises a base (1) and a moving portion (2) and articulated support legs (A1,A2,A3) between the moving portion (2) and the base (1) The articulated support legs (A1,A2,A3) are connected to the base (1) by a first translational joint, and jointly restrict movement of the moving portion to displacements in a plane in two translational degrees of freedom and one rotational degree of freedom A decoupled displacement of the moving portion (2) along a first of the two translational degrees of freedom and a decoupled displacement of the moving portion (2) along the rotational degree of freedom both result from actuation of at most two of the first translational joints Actuators (3,3a,3b, 6,7) are operatively connected to a different one of the first translational joints so as to selectively control the displacements of the moving portion (2) in the three degrees of freedom of the moving portion (2).

11 Claims, 3 Drawing Sheets

U.S. PATENT DOCUMENTS

| | | |
|---|---|---|
| 5,031,547 A | 7/1991 | Hirose |
| 5,163,651 A | 11/1992 | Matsumoto |
| 5,351,773 A * | 10/1994 | Yanagisawa ................ 180/8.5 |
| 5,523,941 A | 6/1996 | Burton et al. |
| 5,524,502 A | 6/1996 | Osanai |
| 5,685,232 A | 11/1997 | Inoue |
| 5,779,203 A | 7/1998 | Edlinger |
| 5,794,541 A | 8/1998 | Hirose |
| 6,033,521 A | 3/2000 | Allen et al. |
| 6,190,118 B1 | 2/2001 | Allen et al. |
| 6,196,138 B1 | 3/2001 | Sakai et al. |
| 6,279,490 B1 | 8/2001 | Pastor |
| 6,622,586 B2 | 9/2003 | Scheidegger et al. |
| 6,635,887 B2 | 10/2003 | Kwan et al. |
| 6,637,349 B1 | 10/2003 | Lafferty |
| 6,655,246 B2 | 12/2003 | Grossmann |
| 6,663,073 B1 | 12/2003 | Church |
| 6,666,122 B2 | 12/2003 | Raney et al. |
| 6,722,289 B2 | 4/2004 | Kato |
| 6,729,202 B2 | 5/2004 | Gosselin et al. |
| 6,852,989 B2 | 2/2005 | Kwan et al. |
| 6,892,652 B2 | 5/2005 | Jalbert et al. |

OTHER PUBLICATIONS

Ilian A. Bonev et al., *Singularity Analysis of 3-DOF Planar Parallel Mechanisms via Screw Theory*, Journal of Mechanical Design, vol. 125, Sep. 2003.

Grigore Gogu, *Fully-Isotropic Over-Constrained Planar Parallel Manipulators*, proceedings of 2004 IEEE/RSJ International Conference on Intelligent Robots and Systems (IROS 2004), Sendai, Japan.

Alexander Yu and Ilian A. Bonev, *Geometric Method for the Accuracy Analysis of a Class of 3-DOF Planar Parallel Robots*, submitted to Mechanism and Machine Theory, 2006.

\* cited by examiner

PLANAR PARALLEL MECHANISM AND METHOD

CROSS-REFERENCE TO RELATED APPLICATION

The present patent application claims priority on U.S. Provisional Patent Application No. 60/738,092, filed on Nov. 17, 2005.

BACKGROUND OF THE INVENTION

1. Field of the Invention

The present invention relates to planar parallel mechanisms (i.e., planar parallel manipulator) and, more particularly, to a planar parallel mechanism having a platform movable in a plane along three degrees of freedom (x, y, θ).

2. Background Art

Different precision table units have been provided for displacing and positioning a moving platform in a plane. Precision table units are found in various uses, for instance, for the precise positioning of specimens, as in a microscope stage, or for precise fiber alignment, as in an alignment stage.

Most such table units are based on a serial architecture, but some have parallel architectures. In a typical table unit based on a serial mechanism, a rotary stage is mounted on top of a single-axis translation stage, which in turn is mounted on another single-axis translation stage. Such a stack-up configuration has three degrees of freedom, being two translations along X and Y axes and a rotation about Z axis.

Such a serial mechanism has the advantage of great simplicity in its control of motion. If the table unit is to be rotated, only the rotary stage is set in motion. If the table unit is to be displaced along the X axis, only the translation stage whose axis is parallel to the X axis is put in motion. Such a property is called decoupling. The relationship between the inputs, which are the positions of the actuators, and the output, which is the position and orientation of the moving platform, of such a mechanism is decoupled.

Decoupling is advantageous because of the simplicity of motion control, and also because it ensures that the table unit has a constant output resolution at any position and orientation. A major drawback is that serial mechanisms are self-supportive, whereby a ground-based actuator must support the weight of other actuators, in addition to the load. Therefore, for some movements, some of the relatively heavy actuators are displaced together with the moving platform, and therefore these table units are relatively sluggish.

Parallel mechanisms have a plurality of supporting members called legs, each separated from one another (i.e., in parallel). Consequently, a load supported by the moving platform is split into smaller loads for each leg. Parallel mechanisms are also advantageous in allowing the actuators of the legs to be base-mounted. Consequently, for a same object to be moved, parallel mechanisms involve substantially smaller loads set in motion than would require a serial mechanism.

One major disadvantage of most parallel mechanisms is that the relationship between the input motion from the actuators and the output motion of the moving platform is highly coupled and nonlinear. An input-output relationship is said to be coupled, in the case of a three-degree-of-freedom planar parallel mechanism, when for a motion of the moving platform along X or Y axis, or about Z axis, more than one actuator are to be driven at different rates. An input-output relationship is said to be nonlinear when, for a given position and orientation of the moving platform, there exist several possibilities for the positions of the actuators, or when for given positions of the actuators, there exist several possibilities for the location of the moving platform.

Various so-called planar parallel mechanisms whose moving platforms undergo a planar three-degree-of-freedom controllable motion have been provided in prior art and some have found application in industry.

U.S. Pat. No. 6,622,586, issued Sep. 23, 2003 to Scheidegger et al., entitled "Positioning Device," discloses a three-degree-of-freedom planar parallel mechanism whose moving platform has three linear guides arranged in a symmetrical Y-shape and whose actuators drive three pins along a common circular path, each pin restrained to move along one of the three guides of the moving platform. This design has the advantages of an unlimited rotational capability and relatively simple input-output relationship. However, this relationship is highly coupled.

The publication "PRP Planar Parallel Mechanism in Configurations Improving Displacement Resolution," by Stéphane Ronchi et al. (proceedings of the First International Conference on Positioning Technology, Hamamatsu, Japan, Jun. 9-11, 2004), discloses a similar three-degree-of-freedom planar parallel mechanism for precision positioning whose moving platform has three linear guides arranged in a symmetrical Y-shape and whose linear actuators drive three pins along the sides of an equilateral triangle, each pin restrained to move along one of the three guides of the moving platform. This design, too, has the advantage of a relatively simple input-output relationship. However, this relationship is still highly coupled.

U.S. Pat. No. 5,163,651, issued on Nov. 17, 1992 to Matsumoto, entitled "Movable Table," discloses a positioning device based on a three-degree-of-freedom planar parallel mechanism. The moving platform of this mechanism has three linear guides arranged in a T-shape, for which base-mounted linear actuators drive three pins along the sides of a Π-shape, each pin restrained to move along one of the three guides of the moving platform. This mechanism has a relatively simple input-output relationship, which is, however, completely coupled.

The publication "Singularity Analysis of 3-DOF Planar Parallel Mechanisms via Screw Theory," by Ilian A. Bonev et al. (Journal of Mechanical Design, Vol. 125, September 2003), presents kinematic analyses of all general three-degree-of-freedom planar parallel mechanisms with three identical legs. In this reference, it is shown that most planar parallel architectures have complex input-output relationships that are flawed by singularities near which the output precision is significantly deteriorated. Conditions for simplifying some designs are given but no new specific examples are shown.

The publication "Fully-Isotropic Over-Constrained Planar Parallel Manipulators," by Grigore Gogu [proceedings of 2004 IEEE/RSJ International Conference on Intelligent Robots and Systems (IROS 2004), Sendai, Japan], discloses all possible designs of theoretically perfect planar parallel mechanisms with three legs. The kinematic model of these parallel mechanisms is the same as or nearly the same as that of a serial mechanism. However, these parallel mechanisms are not suitable for precision positioning devices because they have too many joints and offer little support to the moving platform.

U.S. Pat. No. 6,196,138, issued on Mar. 6, 2001 to Sakai et al., entitled "Movable Table Unit," provides a three-degree-of-freedom planar parallel mechanism that basically consists of a translation stage on which a two-degree-of-freedom parallel mechanism is mounted. In the latter, three points of a moving platform are constrained to move along three linear guides that are normal to the axis of the translation stage. Two of the points are displaced along the linear guides through actuators. The proposed mechanism therefore has a simple input-output relationship. The linear stage controls directly the motion along an X axis, the other two linear actuators control directly the motion along a Y axis when moved in the same direction, while when these two linear actuators are moved in opposite directions, they control the rotation about a Z axis. However, the mechanism of U.S. Pat. No. 6,196,138 is not truly parallel and has the same disadvantage as a serial mechanism, in that the last two actuators are not base-mounted.

U.S. Pat. No. 6,635,887, issued on Oct. 21, 2003 to Kwan et al., entitled "Positioning System for Use in Lithographic Apparatus," discloses a three-degree-of-freedom planar parallel mechanism that consists of a translational stage which is transversely mounted onto two other parallel translational stages through flexure joints. When the two base-mounted actuators move in the same direction and at the same rates, the moving platform uniquely translates along an axis parallel to the directions of the two base-mounted actuators. When the two base-mounted actuators move in opposite directions and at some specially prescribed rates, the moving platform uniquely rotates. Finally, when, the third actuator is displaced, the moving platform is displaced solely along the direction of the third actuator. This mechanism has the disadvantage of not having all of its actuators mounted on the base. Furthermore, the range of rotations of this mechanism is severely limited due to the flexure joints.

U.S. Pat. No. 5,523,941, issued on Jun. 4, 1996 to Burton et al., entitled "X-Y-Theta Positioning Mechanism," discloses a three-degree-of-freedom planar parallel mechanism that is driven by three base-mounted linear actuators that push the moving platform through rollers. While the input-output relationship may be approximated as simple for small rotations of the moving platform, it becomes extremely complex for larger rotations.

SUMMARY OF INVENTION

It is therefore an aim of the present invention to provide a three-degree-of-freedom planar parallel mechanism that addresses issues associated with the prior art.

It is a further aim of the present invention to provide a partially decoupled three-degree-of-freedom planar parallel mechanism.

It is a still further aim of the present invention to provide a three-degree-of-freedom planar parallel mechanism that has no singular configurations.

Therefore, in accordance with the present invention, there is provided a manipulator for supporting and displacing an object, comprising a base; a moving portion adapted to support the object; at least three articulated support legs each having at least three joints and extending between the moving portion and the base for supporting the moving portion, each of the articulated support leg being connected to the base by a first translational joint, the articulated support legs being arranged with respect to one another between the base and the moving portion so as to restrict movement of the moving portion to displacements in a plane in two translational degrees of freedom and one rotational degree of freedom with respect to the base, with a decoupled displacement of the moving portion along a first of the two translational degrees of freedom and a decoupled displacement of the moving portion along the rotational degree of freedom both resulting from actuation of at most two of the first translational joints; and at least three actuators being each operatively connected to a different one of the first translational joints so as to selectively control the displacements of the moving portion in any one of the three degrees of freedom of the moving portion.

Further in accordance with the present invention, there is provided a method for controlling a manipulator, comprising the steps of: providing a manipulator having a moving portion supported by at least a first, a second and a third articulated support leg each being connected to a base by a first translational joint, the articulated support legs being arranged with respect to one another between the base and the moving portion so as to restrict movement of the moving portion to displacements in a plane in two translational degrees of freedom and one rotational degree of freedom with respect to the base; actuating displacements $\rho_2$ and $\rho_3$ of the first translational joints of the second and third articulated support legs, respectively, to cause a variation of position y of the moving portion along a single one of the two translational degrees of freedom; and controlling a variation of orientation $\theta$ of the moving portion along the rotational degree of freedom by actuating at least one of the displacements $\rho_2$ and $\rho_3$ of the first translational joints of the second and third articulated support legs, respectively.

In accordance with an embodiment, there is provided a mechanism for displacing a moving platform that is mounted through a pivot onto a moving portion that slides along a linear guide that is mounted orthogonally on at least one base-mounted linear actuator that controls directly the displacement of the moving portion along an axis parallel to the direction of the base-mounted actuator. Furthermore, means are provided for the moving portion to slide along an axis that runs between two moving portions that are mounted through pivots onto two other independently driven base-mounted linear actuators whose directions are normal to the direction of the first base-mounted linear actuator.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 2:
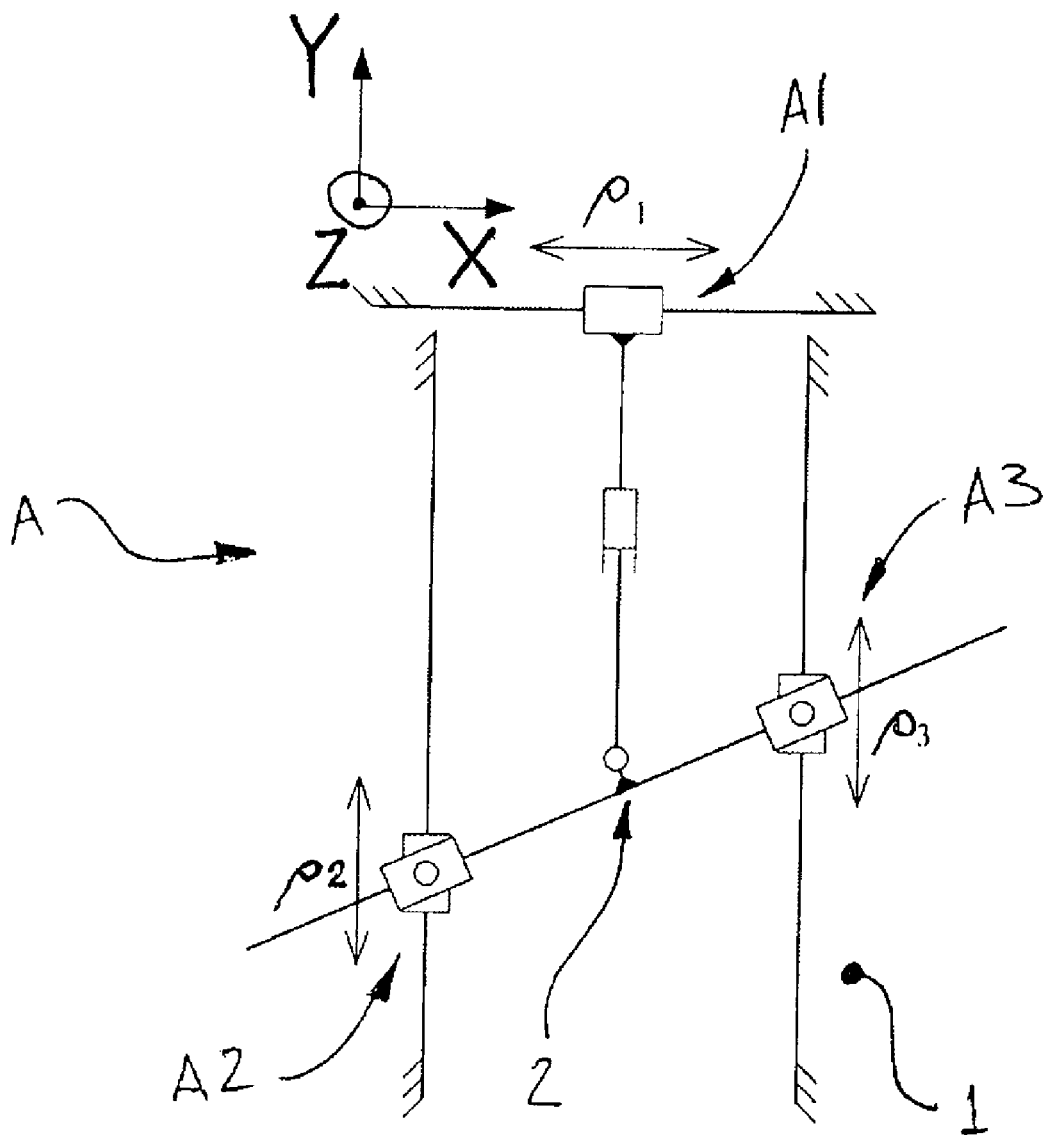
FIG. 2 is a schematic top view of the planar parallel mechanism of FIG. 1.

According to the drawings and more particularly to FIG. 2, a three-degree-of-freedom planar parallel mechanism in accordance with a preferred embodiment is generally illustrated as A. The mechanism A has a moving platform 2 that is displaceable in a plane along three degrees of freedom, namely translations along axes X and Y, and a rotation about axis Z.

The mechanism A has three articulated support legs, namely A1, A2 and A3, supporting the moving platform 2 from a base 1. Legs A2 and A3 both have a PRP configuration, thus with a succession of a prismatic joint (P-joint, i.e., a translational joint), a revolute joint (R-joint, i.e., a rotational joint) and a prismatic joint, with the base-mounted prismatic joints being actuated. The directions of the actuated prismatic joints are parallel to one another, and parallel to axis Y in the plane of displacement of the moving platform 2.

Leg A1 has a PPR configuration, thus with a succession of a pair of prismatic joints and a revolute joint interfacing the leg A1 to the moving platform 2. The base-mounted prismatic joint is actuated. The direction of the actuated prismatic joint is perpendicular to the directions of the actuated prismatic joints of legs A2 and A3. The direction of the prismatic joint of leg A1 is therefore parallel to axis X.

Figure 3:
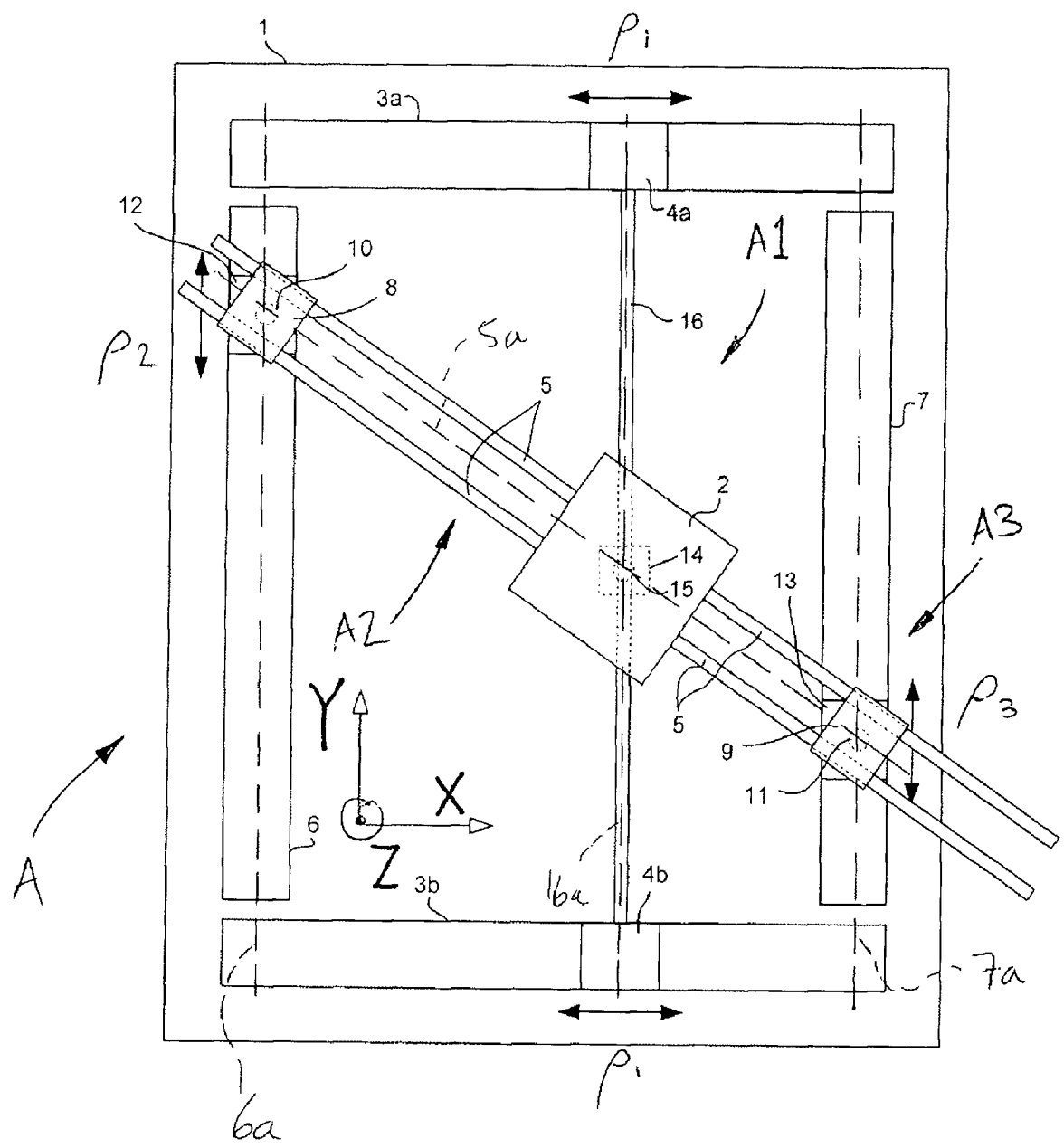
FIG. 3 is a schematic top plan view of the planar parallel mechanism of FIG. 1.

Referring to FIG. 3, the planar parallel mechanism A of FIG. 2 is represented as mechanically implemented in one embodiment. The mechanism A has a moving platform 2 (i.e., moving portion to support a load) that is mounted through a pivot 15 onto a sliding block 14, thereby forming an equivalent to the R-joint of the PPR leg A1. The sliding block 14 translates along a linear guide 16, thereby forming the unactuated P-joint of the PPR leg A1. The direction of translation of the sliding block 14 is along the Y axis, and is represented for illustrative purposes by an axis 16a. The axis 16a passes through the center of the R-joint of leg A1.

The linear guide 16 is mounted orthogonally on the sliding blocks 4a and 4b of two parallel linear actuators 3a and 3b that are fixed to the base 1, to form the actuated P-joint of the PPR leg A1. Although two linear actuators are illustrated (i.e., actuators 3a and 3b), these actuators are combined in one degree of actuation of the mechanism A. It is pointed out that the mechanical implementation of leg A1 of FIG. 3 is advantageous in that the linear guide 16 is supported at opposed ends, by sliding blocks 4a and 4b.

Two other linear actuators 6 and 7 are parallel and fixed to the base 1, and are respectively the degrees of actuation of PRP legs A2 and A3. The actuators 6 and 7 are oriented such that their directions are perpendicular to the directions of actuators 3a and 3b from the top plan view of FIG. 3. For illustrative purposes, the actuators 6 and 7 are respectively provided with axes 6a and 7a, which are parallel to the direction of the actuators 6 and 7. The axis 6a passes through the center of the R-joint of leg A2, whereas the axis 7a passes through the center of the R-joint of leg A3.

Sliding blocks 8 and 9 are mounted onto sliding blocks 12 and 13 of actuators 6 and 7 through pivots 10 and 11 whose centers lie on the axes 6a and 7a, thereby forming the R-joints of the PRP legs A2 and A3. A linear guide 5 that is rigidly attached to the moving platform 2 passes through the sliding blocks 8 and 9, thereby forming the unactuated P-joints of the PRP legs A2 and A3. The direction of the unactuated P-joints of the PRP legs A2 and A3 are parallel, and are therefore represented for illustrative purposes by an axis 5a, passing through the centers of all R-joints.

To control the position (x, y) and orientation (θ) of the moving platform 2, actuators 6 and 7 are driven independently, while actuators 3a and 3b are driven with the same inputs, but independently from actuators 6 and 7.

When only actuators 3a and 3b are displaced, the moving platform 2 slides along the axis 5a associated with the direction of the linear guide 5. Therefore, if the linear guide 5 is parallel to the X axis, the moving platform 2 will move along the X axis only, by an actuation of the actuators 3a and 3b. Alternatively, the actuators 6 and 7 may be actuated in combination with actuators 3a and 3b to displace the moving platform 2 along the X axis only. When only actuators 6 and 7 are displaced with the same rate and direction, the moving platform 2 slides along the linear guide 16 in the Y-axis direction. Finally, when at least one of the actuators 6 and 7 are displaced with opposite directions and/or at different rates, the moving platform 2 rotates and possibly translates.

The input-output relationship of the planar mechanism A is derived with respect to the reference coordinate frame illustrated in FIGS. 1, 2 and 3 (described later), with the X axis being parallel to the direction of the actuators 3a and 3b, and the Y axis being parallel to the axes 6a and 7a associated with the direction of the actuators 6 and 7. Moreover, the center of the moving platform 2 is in register with the center of pivot 15, and the origin of the reference frame is where the center of the moving platform 2 will be when actuators 3a and 3b are at their leftmost position for which the input driving them is $\rho_1=0$, and actuators 6 and 7 are at their bottommost position for which their inputs are respectively $\rho_2=0$ and $\rho_3=0$. Therefore, the following input-output equations govern the motion of the planar parallel mechanism A with respect to the reference coordinate frame:

$$x = \rho_1$$
$$y = \rho_2 + \rho_1\left(\frac{\rho_3 - \rho_2}{s}\right)$$
$$\theta = \tan^{-1}\left(\frac{\rho_3 - \rho_2}{s}\right)$$

where x and y are the position coordinates of the moving platform 2 with respect to the reference coordinate frame X-Y-Z, θ is the orientation of the moving platform 2, and s is a constant representing the distance between the axes 6a and 7a associated with the directions of the actuators 6 and 7.

Therefore, the input-output relationship of the planar parallel mechanism A is partially decoupled and one-to-one in that, for each set of inputs, a unique corresponding set of outputs is obtainable through the solution of simple equations, and vice-versa. Since s is not zero, the input-output relationship is always valid, whereby the mechanism A has no singularities. Furthermore, if the ranges of actuators 6 and 7 are sufficiently large and/or s is sufficiently small, the range of possible orientations for the moving platform 2 can approach 180°.

Finally, in another possible embodiment of the present invention, the linear guide 5 is rigidly fixed to one of the sliders 8 or 9, while being connected to the moving platform 2 through a sliding joint. Referring to FIG. 1, a physical embodiment of the mechanism A is illustrated, with a slider 9' to which the linear guide 5 is rigidly fixed. This modification does not change the above equations of motion, while allowing the guide 5 to stick out only from one side of the planar parallel mechanism A, thus reducing the required footprint of the parallel mechanism A. Both of these embodiments provide great support for the moving platform 2, thus providing accuracy in the position and orientation of the moving platform 2.

Figure 1:
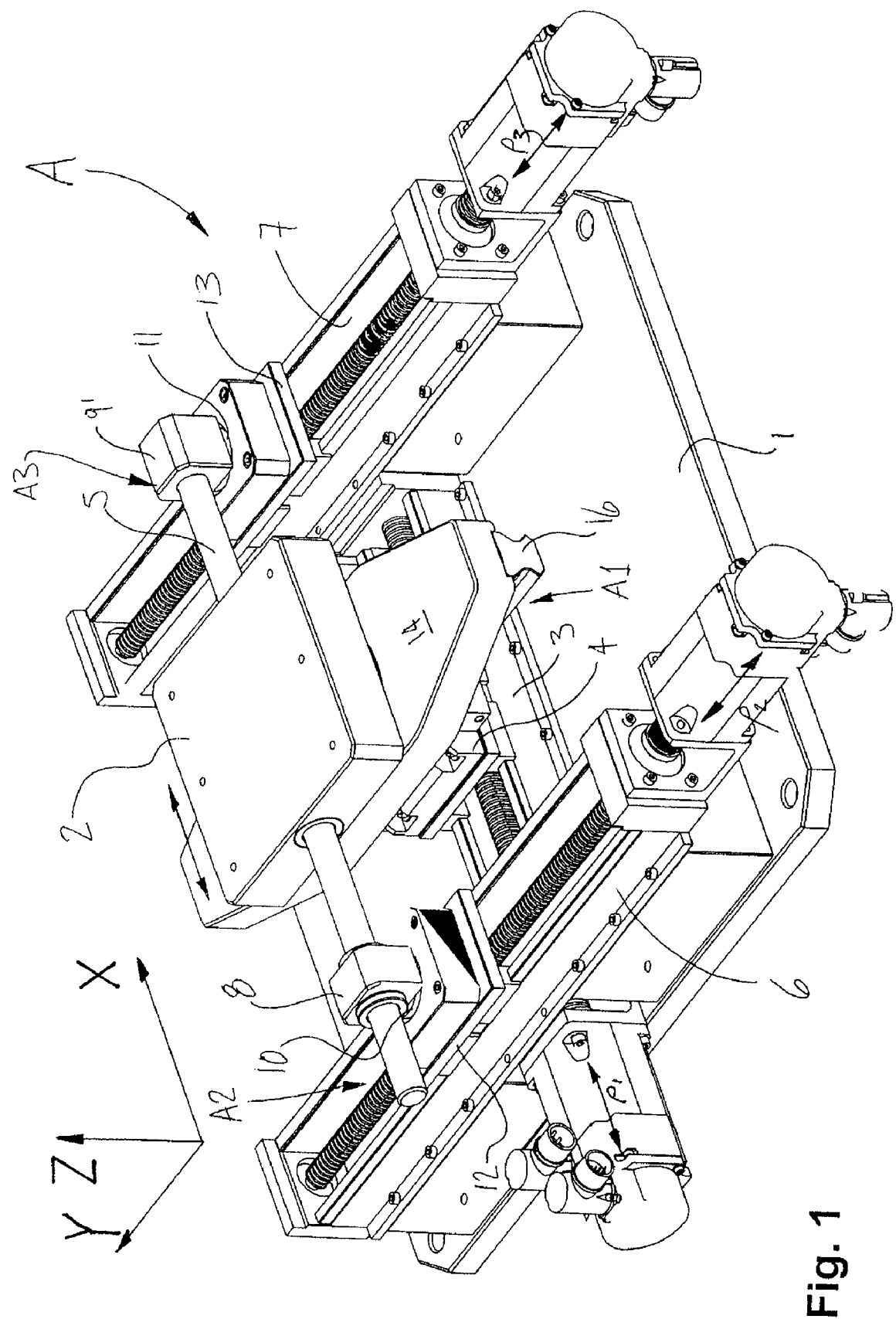
FIG. 1 is a perspective view of a physical embodiment of a planar parallel mechanism in accordance with a preferred embodiment of the present invention.

In the physical embodiment of FIG. 1, the actuator 3 (with sliding block 4) and the actuators 6 and 7 are leadscrew actuators. More specifically, each of the actuators 3, 6 and 7 has a rotational motor 20 with a leadscrew 21 at the output. Accordingly, the sliding blocks 4, 12 and 13 for the actuators 3, 6 and 7, respectively, each have a nut (not visible) that is in threading engagement with the leadscrew 21, such that rotational actuation by the motors 20 results in a translational motion of the sliding blocks 4, 12 and/or 13.

The publication "Geometric Method for the Accuracy Analysis of a Class of 3-DOF Planar Parallel Robots," by Alexander Yu and Ilian A. Bonev [submitted to Mechanism and Machine Theory, 2006], presents a comparison between the kinematic accuracy of the planar parallel mechanism A of FIGS. 1 to 3 and two other 3-PRP three-degree-of-freedom planar parallel mechanisms. It is shown that the output error (the offset between the desired and actual position and orientation of the moving platform) due to input errors (errors in the actuator positions) is generally smaller for the planar parallel mechanism A. Namely, it is shown that for the same bounds on the input errors, the planar parallel mechanism A leads to smaller maximum position errors. Furthermore, for a given orientation, planar parallel mechanism A leads to the same maximum position error at any position, while the maximum position errors differs from one position to another in the other two robot designs. Thus, the planar parallel mechanism A of FIGS. 1 to 3 offers a performance that is relatively homogenous.

A variety of uses are contemplated for the planar parallel mechanism A. For instance, it is considered to use the planar parallel mechanism A as a positioning device for use in a semiconductor production unit, an LCD panel production unit, a precision measuring instrument, a lithographic projection apparatus, a precision processing machine, an inspection machine, an alignment stage for photonics assembly, a precision machine for printed boards, a microscope stage, a working table for a machine tool, and the like.

The planar parallel mechanism A of FIGS. 1 to 3 is rigid and thus well suited to support loads, considering that the rotational axes of the R-joints of all legs are normal to a plane of displacements of the moving platform 2, and that the directions of all P-joints are parallel to this plane. It is pointed out that axes 5a, 6a, 7a and 16a each lie in planes parallel to the X-Y plane of the base 1.

Although the planar parallel mechanism A is illustrated as having a 2PRP+1PPR configuration, it is considered to provide the planar parallel mechanism A with inactive joints. As an example, one of the PRP legs could have a cylindrical joint in a PRC or PRPR configuration, with the revolute joint being inactive.

The invention claimed is:

1. A manipulator for supporting and displacing an object, comprising:
a base;
a moving portion adapted to support the object;
at least three articulated support legs each having at least three joints and extending between the moving portion and the base for supporting the moving portion, each of the articulated support legs being connected to the base by a first translational joint, with one of the articulated legs having a joint sequence being translational-translational-rotational from the first translational joint, the articulated support legs being arranged with respect to one another between the base and the moving portion so as to restrict movement of the moving portion to displacements in a plane in two translational degrees of freedom and one rotational degree of freedom with respect to the base, with a decoupled displacement of the moving portion along one of the two translational degrees of freedom and a decoupled displacement of the moving portion along the rotational degree of freedom both resulting from actuation of at most two of the first translational joints; and
at least three actuators being each operatively connected to a different one of the first translational joints so as to selectively control the displacements of the moving portion in any one of the three degrees of freedom of the moving portion.

2. The manipulator according to claim 1, wherein the linear actuators are leadscrew and nut combinations actuated by a rotational motor.

3. The manipulator according to claim 1, wherein a first one and a second one of the articulated legs each have a joint sequence being translational-rotational-translational from the first translational joints, and a third one of the articulated legs has the joint sequence being translational-translational-rotational from the first translational joint.

4. The manipulator according to claim 3, wherein the directions of the first translational joints of the first one and the second one of the articulated legs are parallel to one another.

5. The manipulator according to claim 4, wherein the direction of the first translational joint of the third one of the articulated legs is perpendicular to the directions of the first translational joints of the first one and the second one of articulated legs from a top plan view of said plane of the moving portion.

6. The manipulator according to claim 4, wherein the directions of the end translational joints of the first one and the second one of articulated legs adjacent to the moving portion are the same.

7. The manipulator according to claim 6, wherein the end translational joints of the first one and the second one of the articulated legs have a common guide rail, with the common guide rail being the displaceable member of one of the end translational joints and the fixed member of the other one of the end translational joints.

8. A method for controlling a manipulator, comprising the steps of:
providing a manipulator having a moving portion supported by at least a first, a second and a third articulated support legs each being connected to a base by a first translational joint, with one of the articulated legs having a joint sequence being translational-translational-rotational from the first translational joint, the articulated support legs being arranged with respect to one another between the base and the moving portion so as to restrict movement of the moving portion to displacements in a plane in two translational degrees of freedom and one rotational degree of freedom with respect to the base;
actuating displacements $\rho_2$ and $\rho_3$ of the first translational joints of the second and third articulated support legs, respectively, to cause a variation of position y of the moving portion along a single one of the two translational degrees of freedom; and
controlling a variation of orientation $\theta$ of the moving portion along the rotational degree of freedom by actuating at least one of the displacements $\rho_2$ and $\rho_3$ of the first translational joints of the second and third articulated support legs, respectively.

9. The method according to claim 8, further comprising a step of actuating a displacement $\rho_1$ of the first translational joint of the first articulated support leg to cause a variation of position x of the moving portion along at least one of the two translational degrees of freedom according to the equation:

$$x = \rho_1;$$

with the variation of position y of the moving portion along said single one of the two translational degrees of freedom being in accordance with the equation:

$$y = \rho_2 + \rho_1 \left( \frac{\rho_3 - \rho_2}{s} \right),$$

in which s is a constant representing a distance by which the first translational joints of the second and third articulated support legs are separated; and with the variation of orientation θ of the moving portion along the rotational degree of freedom being in accordance with the equation:

$$\theta = \tan^{-1}\left(\frac{\rho_3 - \rho_2}{s}\right).$$

10. The method according to claim 9, further comprising a step of setting a Cartesian coordinate system with the variation of position x being along the X-axis, the variation of position y being along the Y-axis, and the variation of orientation θ being about the Z-axis, prior to controlling the variations of positions and orientation of the moving portion.

11. The method according to claim 10, wherein the step of setting the Cartesian coordinate system involves setting the origin of the Cartesian coordinate system where $\rho_1$, $\rho_2$ and $\rho_3$ are equal to zero.

* * * * *